Sept. 11, 1923.　　　　　　　　　　　　　　　1,467,554
R. MOORE
INTERLOCKING DEVICE
Filed Oct. 12, 1920　　　3 Sheets-Sheet 1
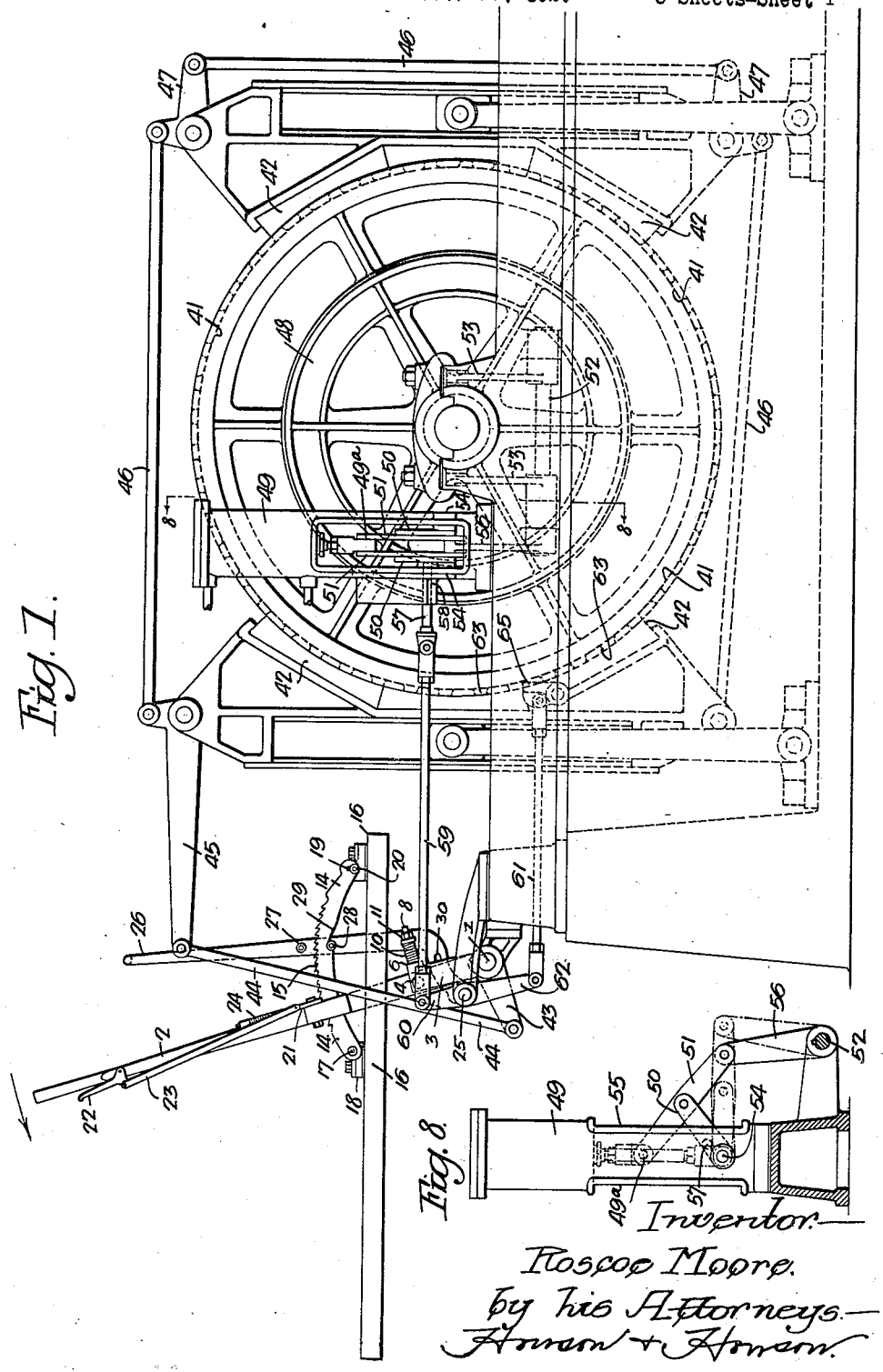
Inventor.
Roscoe Moore.
by his Attorneys.
Howson & Howson

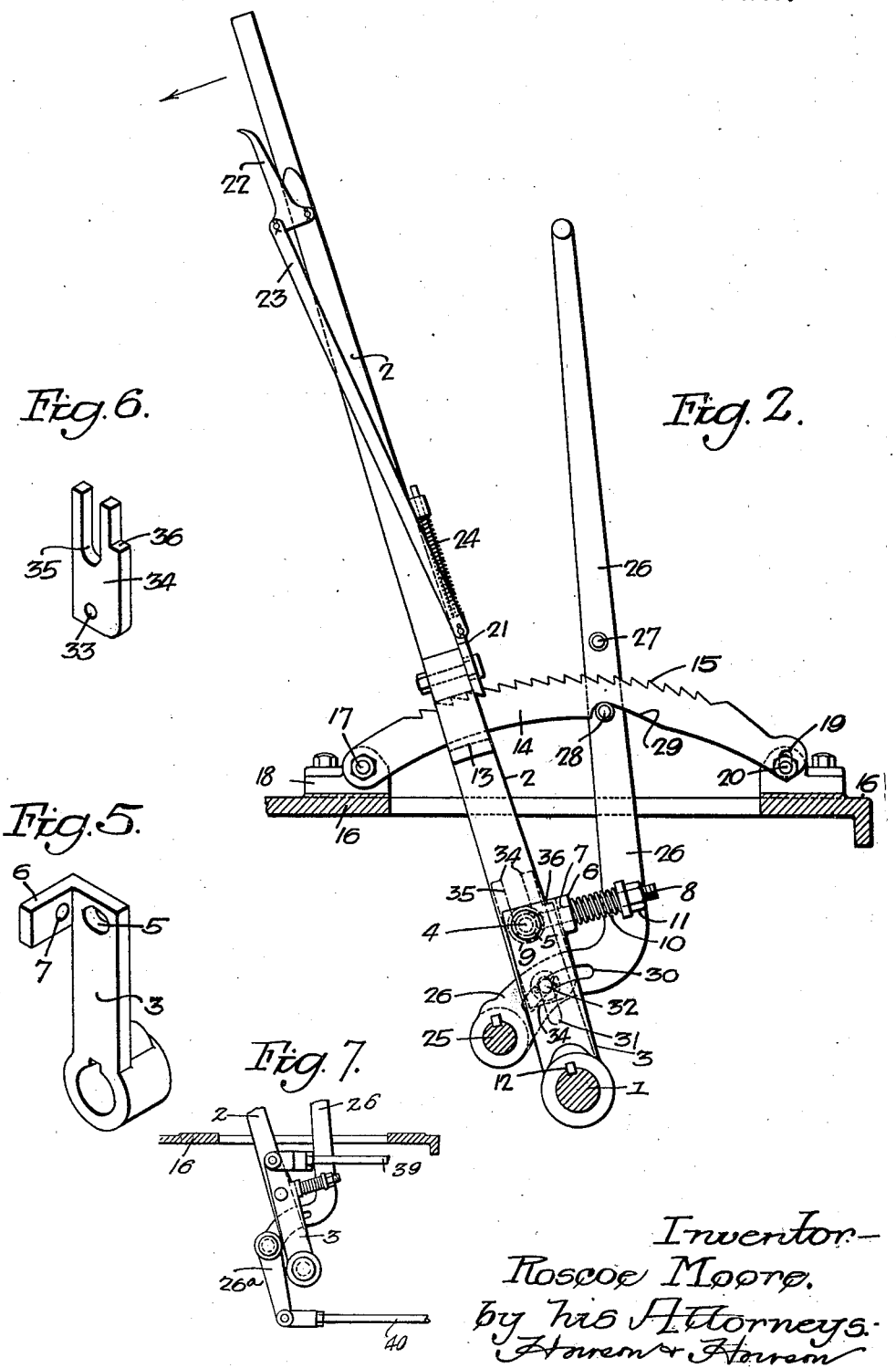

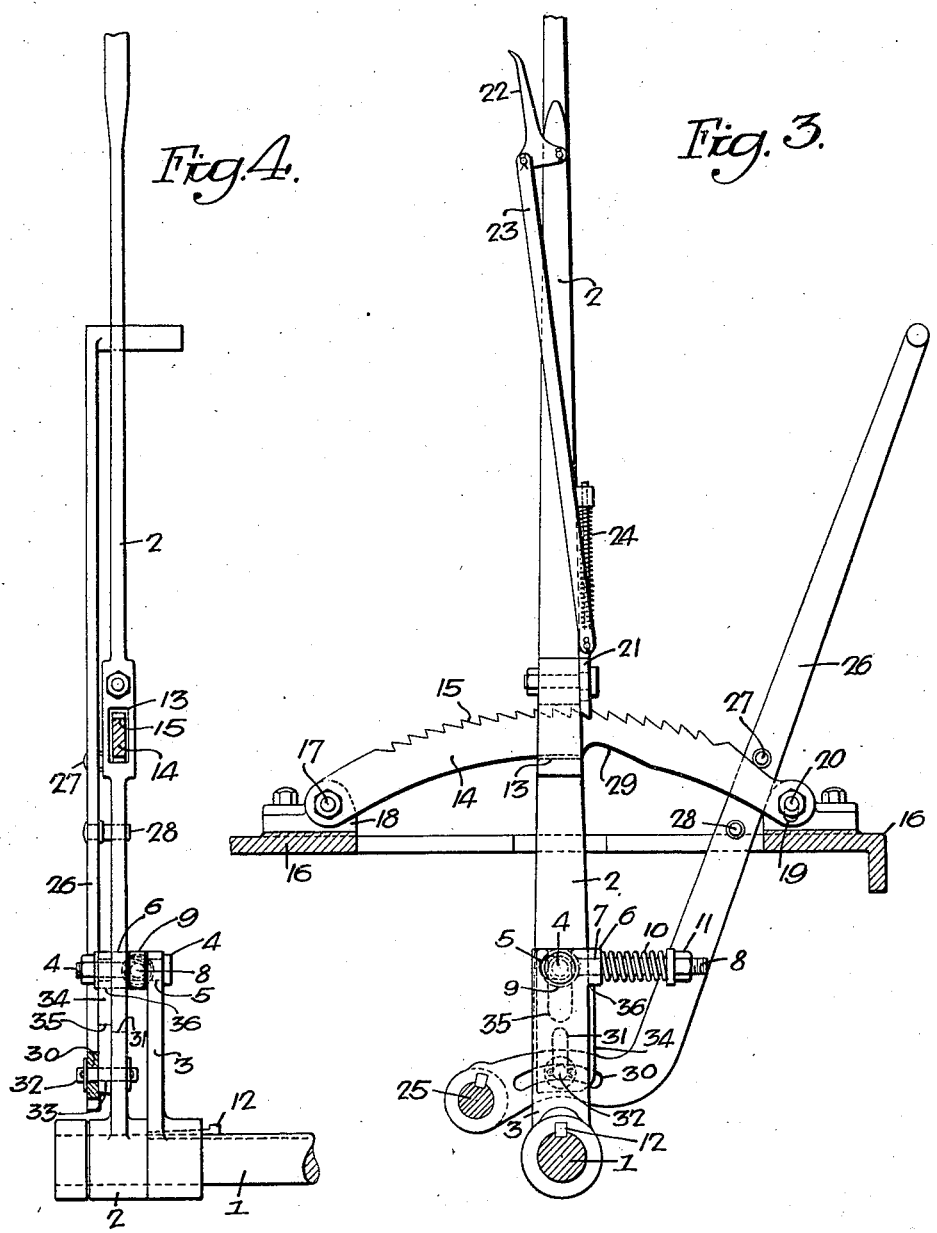

Patented Sept. 11, 1923.

1,467,554

UNITED STATES PATENT OFFICE.

ROSCOE MOORE, OF WILKES-BARRE, PENNSYLVANIA, ASSIGNOR TO VULCAN IRON WORKS, OF WILKES-BARRE, PENNSYLVANIA, A CORPORATION OF PENNSYLVANIA.

INTERLOCKING DEVICE.

Application filed October 12, 1920. Serial No. 416,339.

*To all whom it may concern:*

Be it known that I, ROSCOE MOORE, a citizen of the United States, residing in Wilkes-Barre, Pennsylvania, have invented certain Improvements in Interlocking Devices, of which the following is a specification.

My invention relates to improvements in interlocking devices, my improved device being particularly adapted for use in connection with the clutch and brake mechanism of hoisting machinery of the type commonly employed in mines, and which comprises a plurality of drums at least one of which is loose and controlled by a manually operated brake.

One object of my invention is to provide an improved device interlocking the said clutch and brake mechanisms whereby the former cannot be withdrawn from operation until the latter has been applied.

A further object of my invention is provide means whereby before the clutch can be withdrawn from operation the brake controlling the parts clutched must be applied with sufficient force to positively hold these parts stationary.

A still further object is to provide means whereby after the brake has been applied and the clutch withdrawn, the brake cannot be released until the clutch has again been moved into operative position.

These and other objects hereinafter brought out I attain by means of the mechanism illustrated in the accompanying drawings, in which:

Figure 1, is a side elevation of my interlocking device as applied to a hoisting device of the loose drum type, common to mine shaft cage lifts;

Fig. 2, is an enlarged view of the lever mechanism shown in Fig. 1, and forming the subject of my invention, said levers being shown in their operative positions;

Fig. 3, is a side elevation showing the levers in the inoperative positions;

Fig. 4 is a front elevation of the said device;

Fig. 5, is a view in perspective of the dog;

Fig. 6, is a view in perspective of the locking bar;

Fig. 7, is a side elevation of the lower portion of the interlocking device illustrating a modification within the scope of my invention, and Fig. 8, is a side elevation of the clutch-actuating mechanism.

With reference to the drawings, 1 represents a rock shaft with which, in the present instance, the brake controlling the loose drum 41 of a hoist is operably connected, and 2 a hand brake lever mounted upon the shaft by means of which the shaft is rocked for the purpose of operating the said brake. Connection between the brake shoes 42 and the shaft 1 is, in the present instance, established by means of a lever arm 43 fixed to the said shaft, a reach rod 44, a brake lever 45, and a series of reach rods and bell crank levers, 46 and 47 respectively. In the present instance the operating lever 2 is mounted loose upon the shaft, while keyed to the shaft adjacent the operating lever by means of a key 12 is a small lever or dog 3, said lever being shown in perspective in Fig. 5, and a connecting bolt or pin 4 passing through apertures in both the operating lever 2 and the lever 3 secures the said levers together. The aperture in the operating lever through which the bolt 4 passes is substantially the same diameter as the bolt itself, while the aperture 5 in the lever 3, through which the said bolt 4 extends, is elongated and in the nature of a slot, whereby a certain limited relative movement between the levers is permitted. The lever 3 has at the top a lateral arm 6 which extends across the space intervening between the two levers, said arm 6 being apertured at 7 to provide passage for a spring rod 8 having an eye 9 at one end through which the bolt 4 extends, the said eye portion of the bolt 8 being interposed between the operating lever and the body of the lever 3, as most clearly shown in Fig. 4.

A spring 10 is carried upon the rod 8 and abuts the outer surface of the arm 6 of the lever 3, and a nut 11 upon the outer threaded end of the said rod 8 confines the spring and may be moved upon said rod to regulate the compression thereof between the nut itself and the arm 6, such compression causing the spring to exert a pressure tending to draw the rod 8 outwardly through the aperture 7, thereby tending to hold the lever 2, through the medium of the pin 4, tightly against the inner face of the arm 6.

The operating lever 2 has, in the present instance, a slotted way 13 through which extends a rack 14 having teeth 15 formed in the upper edge thereof, said rack being segmental in form and normally lying upon the arc of a circle having its center in the center line of the shaft 1. The rack 14 is pivotally mounted at one end thereof upon a fixed frame 16 to which it is secured by means of a bolt or pin 17 extending through the rack and through a suitable lug 18 upon the said frame, while the opposite end of the said rack is slotted at 19 and is secured to the frame 16 by a bolt or pin 20 extending through the said slot, whereby limited movement of the rack about the pivot pin 17 is permitted.

Carried by the operating lever 2 and slidable thereon is a pawl or detent 21, said pawl being adapted to engage the teeth 15 of the rack for the purpose of holding the lever in the desired position. An operating handle 22, pivotally mounted at the top of the operating lever and connected with the pawl 21 by means of a connecting rod 23, provides means for disengaging the pawl from the teeth 15 to permit movement of the lever 2. A spring 24 carried by the lever 2 exerts a pressure upon the pawl 21 tending to hold the pawl in a depressed position in which it lies in engagement with the teeth 15.

The arrangement of the parts is such that when the slotted end of the rack 14 is moved upwardly to the extreme position, it is impossible to elevate the detent to a sufficient extent to disengage it from the teeth 15 so that when the rack is in the said elevated position, the operating lever is locked.

Mounted in the present instance upon a shaft 25 independent of the shaft 1, is a lever 26, said lever extending upwardly adjacent the side of the rack 14 and having a pin 27 projecting from the side which is adapted to bear against the upper edge of the rack so that when the said lever 26 is in the inoperative position, in which it is shown in Fig. 3, the movable end of the rack is held by the said pin 27 in the depressed position. A similar pin 28 extending from the lever 26 beneath the rack 14 is adapted, when the lever is advanced to the operative position in which it is shown in Fig. 2, to bear against the under side of the said rack so as to oscillate the latter upwardly to the extreme limit of the movement provided for by the slot 19.

In the present instance I have shown a portion of the rack cut away at the under side to form a recess 29, into which the pin 28 moves as the lever is advanced whereby the said rack is elevated accurately to the proper extent, said recess also providing a stop for the lever 26 when it has reached the final operative position. When the lever 26 is in the said operative position and the pin 28 occupies the rear end of the recess 29, the downward thrust exerted upon the lever 26 by the rack is sufficient and so directed as to retain the lever 26 in the operative position, as is most clearly illustrated in Figure 2.

The bottom portion of the lever 26 extends at an angle from the upper main portion, and a segmental slot 30 is formed in the said bottom portion, said slot, when the lever is in the inoperative position shown in Fig. 3, lying upon the circumference of a circle, the center of which lies in the center line of the shaft 1.

A vertical slot 31 is formed in the bottom of the operating lever 2, said slot 31 being so located that the bottom thereof lies in a plane with the bottom edge of the slot 30 when the lever 26 is in the inoperative position, as clearly shown in Fig. 3. A pin 32 extends through the said slots 30 and 31, and is fixed therein whereby interconnection is established between the lever 26 and the lever 2, and interposed between the said two levers and supported by the pin 32 which extends through an aperture 33 therein, is a locking bar 34, said locking bar being shown in perspective in Fig. 6. The locking bar extends upwardly beside the lever 2 and is held in this upright position relative to the said lever 2 by the pin 4 which occupies a slot 35 extending inwardly from the upper edge of the said locking bar.

A portion of the locking bar 34 extends beyond that edge of the lever 2 which normally is abutted by the arm 6 of the lever 3, and a shoulder 36 formed by this extension of the locking bar is adapted to engage the under side of the arm 6 when the lever 3 and operating lever 2 are in their normal relative positions, so that elevation of the locking bar and consequently movement of the lever 26 is prevented. It is apparent, however, that should the operating lever 2 be separated or drawn away from the arm 6, the locking bar 34 being carried with the lever 2, withdrawal of the shoulder 36 from under the arm 6, will be effected, thereby leaving the said locking bar free to move upwardly along the operating lever 2. Under these conditions, the lever 26 may be advanced toward the lever 2, the movement of the lever 26 being provided for by the slots 30 and 31, through which the pin 32 which carries the locking bar moves.

The operation of the device is as follows: We will suppose that in the present instance the shaft 1, as previously explained, is operably connected to the braking mechanism controlling the loose drum of the hoist and that the said brake is applied by shifting the operating lever 2 in the direction of the arrows, reference being had to Figs. 1 and 2 of the drawings. We will suppose further that the shaft 25 is connected operably with clutch mechanism through which motion is transmitted to the said loose drum from the actuating machinery, and that withdrawal of the clutch from engagement with the drum involves first the operation or shifting from the normal position of the lever 26, in which normal position it is shown in Fig 3.

In the present instance the clutch 48 is shifted to engage and disengage the drum by means of a clutch engine 49, said engine operating, through the medium of a toggle device comprising lever arms 50, 50 and 51, 51, to rock a shaft 52, to which the clutch 48 is connected by arms 53. In the said toggle device one extremity of the arms 50 is secured to fixed pivots 54, 54, upon the engine frame 55, the opposite ends of the arms 50 being pivotally secured to the levers 51 intermediate the ends thereof. The levers 51 have one end attached to the piston rod 49$^a$ of the engine, while the other ends thereof are pivotally connected with an arm 56 keyed to the said shaft 52. With the clutch 48 disengaged from the drum, in which condition it is indicated in Fig. 1, the piston of the engine 49 is in the upper end of the cylinder and the elements of the toggle device and allied parts lie in the positions indicated by the full lines in Fig. 8, the positions of the said elements and parts corresponding to the drum-engaging position of the clutch being indicated by the broken lines. A pin 57 is adapted to enter a suitable aperture 58 in the frame 55 and to overlie one of the arms 50 and 51 when the elements are in the position indicated by the broken lines, thereby preventing operation of the engine to disengage the clutch until the pin is withdrawn. After the pin has been withdrawn, however, and the engine started for the purpose of withdrawing the clutch, the pin is prevented from re-entering the aperture 58 by the said arm 50 which in rising covers the aperture as shown in Fig. 8. The pin 58 is connected by means of a reach rod 59 to an arm 60 fixed to the shaft 25, the arrangement being such that the engine-locking position of the pin corresponds with the said normal position of the lever 26. It will therefore be apparent that operation of the engine 49 for the purpose of disengaging the clutch requires first the shifting of the lever 26 from the normal, and that, furthermore, after the engine is put into operation and the clutch disengaged, return of the lever 26 to the normal is prevented until the clutch lies once more in engagement with the drum. I have also shown in Fig. 1, means whereby a positive lock for the drum 41 is brought into play by the shifting of the lever 26 from the normal, said lock consisting of a pawl 65 operably connected with the shaft 25 by means of a reach rod 61 and an arm 62 fixed to the said shaft, said pawl being adapted to engage teeth 63 upon the drum.

In shifting the operating lever 2 to apply the brakes, the operating lever and the lever 3 being held together by tension of the spring 10, as previously described, the said levers will move as one until the shaft has been rocked sufficiently to effect application of the brake. When the force with which the brake is applied exceeds the pressure of the spring 10, the lever 3 will cease to move and the lever 2 will be drawn away from the arm 6 against the tension of the spring, this movement of the lever 2 relative to the dog being permitted by the slot 5, as heretofore explained. The pawl 21 coacting with the teeth 15 of the rack 14 holds the lever 2 in the extreme operative position to which it has been moved, in which position it is separated from the arm 6 of the lever 3 which normally it abuts. It will thus be seen that the force with which the brake is applied must exceed the pressure exerted by the spring 10, and consequently the minimum force with which the brake is applied may be regulated by adjustment of the said spring.

The operating lever 2 being moved away from the arm 6, the shoulder 36 upon the locking bar which normally engages the under side of the arm 6 and prevents movement of the lever 26, is carried clear of the said arm whereby the locking bar 34 is free to move upwardly along the operating lever. The lever 26 may now be advanced toward the operating lever 2, said lever as it is shifted bringing the pin 28 carried thereby into engagement with the under side of the rack 14 at the recess 29, thereby causing the rack to swing upwardly around its pivot 17 and preventing disengagement of the pawl 21 from the teeth 15, the lever 26 being retained in its advanced position by the downward pressure upon the pin 28 of the said rack itself and by the additional downward pressure exerted upon the rack by the elements which operate in conjunction therewith. It is thus impossible to shift the operating lever 2 to release the brake until such time as the lever 26 is returned to its normal position, in which position the pin 27 bears down upon the upper edge of the rack to return it to its depressed position and to thereby permit disengagement of the pawl 21 from the rack.

The lever 26 having been moved to the advanced position, the clutch engine may, as previously explained, be operated to withdraw the clutch, and coincidently with the initial movement of said engine, the lever 50 moves across the path and in front of the pin 57, thereby positively locking the lever 26 against return to its normal or inoperative position until the clutch engine has completed a return movement and the clutch is fully engaged.

It will be clear from the foregoing that the device in the application in which it is described prevents, (1), withdrawal of clutch until brake has been set with sufficient force to hold the part in connection with which the clutch operates stationary; (2), release of brake until return of the clutch; (3), creeping out of clutch; and (4), accidental withdrawal of clutch prior to application of brake. The device also through the spring 10 provides for regulation and adjustment of the brake pressure to the amount requisite for holding the braked part stationary.

The device is capable of considerable modification in detail with no departure from the essential features of the invention. It is not necessary, for example, that connection between the brake and clutch and their respective levers be made through the medium of a rock shaft, since any means providing a fulcrum for the levers will suffice, the connections with the brake and clutch in such case being made by means of connecting rods 39 and 40 secured to the levers themselves, as illustrated in Fig. 7, the lever 26 in this case having a downward extension 26ª to which the rod 40 is attached.

The possible applications of this device are numerous, and it is to be understood that the use is not to be confined to any particular application, such as that herein described.

I claim:

1. In an interlocking device, the combination of a lever, a member movable with respect to said lever, resilient means tending to retain said member in a definite normal position relative to the lever, a second lever, and means connecting said levers whereby movement of said second lever depends upon the displacement first of said member from the said normal position.

2. In an interlocking device, the combination of a lever, a member movable with respect to said lever, a spring tending to retain said member in a definite normal position relative to the lever, a second lever, an element connected with said second lever and adapted to engage the said member when the latter is in the said normal position to prevent movement of the second lever, said element being disengaged from said member when the latter is displaced from said normal position whereby movement of said second lever is permitted.

3. In an interlocking device, the combination of a lever, a member movable with respect to said lever, a spring tending to retain said member in a definite normal position relative to the lever, means for adjusting the pressure of said spring to vary the force tending to hold said member in the said normal position, and means interconnecting said levers whereby movement of said second lever depends upon the displacement first of said member from the said normal position.

4. In an interlocking device, the combination of a lever, a member movable with respect to said lever, a spring tending to retain said member in a definite normal position relative to the lever, a second lever, means connecting said levers whereby movement of said second lever into an advanced position is dependent upon the displacement first of said member from the normal position, and means preventing movement of said first lever while the second lever is in the said advanced position.

5. In an interlocking device, the combination of a lever, a member movable with respect to said lever, a spring tending to retain said member in a definite normal position relative to the lever, means for retaining said lever in any one of a number of different positions, a second lever, means connecting said levers whereby movement of said second lever into an advanced position is dependent upon the displacement first of said member from the said normal position, and means carried by said second lever and operable in conjunction with the said lever retaining means when the second lever is in the advanced position for preventing movement of the said first named lever.

6. In an interlocking device, the combination of a lever, a member movable with respect to said lever, a spring tending to retain said member in a definite normal position relative to the lever, a second lever, means connecting said levers whereby movement of said second lever into an advanced position is dependent upon the displacement first of said member from the normal position, a movable rack, a pawl upon said first lever adapted to engage the teeth of said rack, means for releasing the pawl from said teeth under normal conditions, and means carried by the said second lever for shifting the rack when the said second lever is in the advanced position so as to prevent withdrawal of the pawl from engagement with the teeth.

7. In an interlocking device, a lever, a movable rack, a pawl carried by said lever and adapted to engage the teeth of said rack, a second lever, means for releasing said pawl from engagement with the said teeth when the second lever is in one of two predetermined positions, and an element carried by said second lever and adapted when the said lever is in the other of said predetermined positions to engage and shift the said rack whereby withdrawal of the pawl from the rack teeth is prevented.

8. In a brake and clutch interlocking device, a control member for said clutch, a control member for said brake, elements operably connecting the clutch with the clutch control member, elements including a spring operably connecting the brake with the brake control member, and means interconnecting said brake and clutch control members whereby the latter is inoperable until said spring is flexed.

9. The combination with a driven member, of a friction brake, a clutch mechanism interconnecting the brake and clutch including locking means operative when the brake is released for preventing release movement of the clutch, and means controlled by pressure of the brake on the driven member for releasing said locking means.

10. The combination with a driven member, of a friction brake, a clutch mechanism interconnecting the brake and clutch including locking means operative when the brake is released for preventing release movement of the clutch, means controlled by pressure of the brake on the driven member for releasing said locking means, locking means operative after disconnection of the clutch for preventing release movement of the brake, and means actuated by re-connection of the clutch for releasing the latter locking means.

11. The combination with a driven member, of a friction brake, a movable element connected with the brake, a brake operating member, a spring connecting the operating member with the movable element and tending to prevent relative movement thereof, a clutch operating member, and means releasable by relative movement of the clutch operating member and the movable element for preventing movement of the clutch operating member.

ROSCOE MOORE.